US007003532B2

(12) United States Patent
Bradshaw

(10) Patent No.: US 7,003,532 B2
(45) Date of Patent: Feb. 21, 2006

(54) SYSTEM AND METHOD FOR SCALEABLE MULTIPLEXED TRANSACTIONAL LOG RECOVERY

(75) Inventor: Dexter Paul Bradshaw, Duval, WA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 10/305,824

(22) Filed: Nov. 27, 2002

(65) Prior Publication Data

US 2004/0103123 A1    May 27, 2004

(51) Int. Cl.
*G06F 12/00*    (2006.01)
*G06F 17/30*    (2006.01)
(52) U.S. Cl. .................. 707/202; 707/203; 707/204
(58) Field of Classification Search ............... 707/202, 707/201, 1
See application file for complete search history.

(56) References Cited

U.S. PATENT DOCUMENTS 4,961,224 A * 10/1990 Yung ........................ 713/201
5,845,292 A * 12/1998 Bohannon et al. .......... 707/202
5,966,706 A * 10/1999 Biliris et al. ............... 707/10
6,721,765 B1 * 4/2004 Ghosh et al. ............... 707/202

OTHER PUBLICATIONS

*ARIES: A Transaction Recovery Method Supporting Fine-Granularity Locking and Partial Rollbacks Using Write-Ahead Logging*; C. Mohan, IBM Almaden Research Center, Don Haderle, IBM Santa Teresa Laboratory and Bruce Lindsay, Hamid Pirahesh and Peter Schwarz, IBM Almaden Research Center; ACM Transactions on Database Systems, vol. 17, No. 1, Mar. 1992.

\* cited by examiner

*Primary Examiner*—Frantz Coby
*Assistant Examiner*—Cindy Nguyen
(74) *Attorney, Agent, or Firm*—Merchant & Gould P.C.

(57) ABSTRACT

A system and method for providing scaleable recovery for a multiplexed transactional log. Unlike a dedicated log that includes log data of only one client, a multiplexed transactional log may include log data from multiple clients. In a multiplexed transactional log, log data from different clients may be multiplexed into the multiplexed transactional log in any order. The multiplexed log is maintained for multiple clients using a scaleable logging process. After a system failure, the multiplexed log is recovered using a scaleable recovery process. The scaleable recovery process includes an end-of-log locating process for locating the end of the multiplexed log and each of the virtual logs with the multiplexed log. The end-of-log locating process is also scaleable.

32 Claims, 8 Drawing Sheets

SYSTEM AND METHOD FOR SCALEABLE MULTIPLEXED TRANSACTIONAL LOG RECOVERY

BACKGROUND OF THE INVENTION

Transactional logging involves maintaining a transactional log that durably records a time serial history of transactions in a system. The transactional log provides information for restoring a system to a particular state in time prior to a system failure. A transactional logging system must be able to reliably and accurately restore logging functionalities after such a system failure.

Traditionally, transactional logging systems have used a dedicated log to support a single log client. Dedicated transactional logging systems are typically very robust and achieve a high performance level. However, the inventor has determined that the high level of reliability of a single log client using a dedicated logging system may actually result in overall performance degradation for a computing environment where multiple log clients are using multiple dedicated logging systems. One of the reasons for this is that each dedicated logging system independently incurs input/output (I/O) overhead to write and retrieve information. The I/O overhead results in adverse performance impact, and the impact is cumulative for each of the independent transactional logging systems. An improved transactional logging system is desirable that could overcome some of these performance problems but could still allow reliable system recovery.

SUMMARY OF THE INVENTION

Briefly stated, the present invention provides scaleable recovery for a multiplexed transactional log. Unlike a dedicated log that includes log data of only one client, a multiplexed transactional log may include log data from multiple clients. In a multiplexed transactional log, log data from different clients may be multiplexed into the multiplexed transactional log in any order. The log data associated with a particular client is represented by a virtual log of that client within the multiplexed transactional log. In one aspect, the invention is directed to a computer-implemented method for transactional logging using a multiplexed log. The computer-implemented method maintains a multiplexed log for multiple clients using a scaleable logging process. After a system failure, the computer-implemented method recovers the multiplexed log using a scaleable recovery process. The scaleable recovery process includes an end-of-log locating process for locating the end of each virtual log within the multiplexed log. The end-of-log locating process is also scaleable.

In yet another aspect, the invention is directed to a computer-implemented method for maintaining a recoverable transactional log. A log block containing log data is received from one of the clients. The log block is appended to a current region in a flush queue. Metadata associated with the current region is updated to account for the newly appended log block in the current region. If the end of the current region is reached, the metadata is appended to the current region in the flush queue.

In still another aspect, the invention is directed to a computer-implemented method for recovering a transactional log after a system failure. A starting point in the transactional log is determined by referring to metadata associated with the transactional log. The last valid owner page within the transactional log is located by checking at discrete intervals from the starting point toward the end of the transactional log. The method checks the validity of a region in the transactional log associated with the last valid owner page. If the region associated with last valid owner page is valid, the first invalid log block in an incomplete region is located where the incomplete region is located beyond the last valid region toward the end of the transactional log. The end of the transactional log is found when the first invalid log block is located.

In yet another aspect, the present invention is directed to a transactional logging system that includes a transactional log, a metadata file, and a multiplexed transactional logging component. The transactional log is typically stored in a storage unit. The transactional log contains log blocks from clients and owner pages that include information on how the log blocks are organized in the transactional log. The metadata file includes information about the transactional log. The multiplexed transactional logging component is configured to append the log blocks and the owner pages to the transactional log and to recover the transactional log after a system failure using information in the owner pages and the metadata file.

DETAILED DESCRIPTION OF THE PREFERRED EMBODIMENT

The inventor of the present invention has appreciated that logging system recovery is an important aspect of a multiplexed transactional logging system. Thus, the present invention focuses on recovering a multiplexed log after a system failure and restoring logging functionalities. For a multiplexed log, restoring logging functionality typically includes determining the end of each of the virtual logs within the multiplexed log. The invention provides a number of methods for locating the end of a multiplexed log and the end of each of the virtual logs within the multiplexed log. The manner in which multiplexed logs are recovered in the present invention is very different from the manner in which dedicated logs are recovered. For example, to recover a dedicated log, a conventional method that scans the entire dedicated log from its last written restart area to locate the end of the log is typically used. Generally, the dedicated log may be scanned sequentially or logarithmically using a binary search algorithm. However, this conventional method is not practical for recovering a multiplexed log. Using this conventional method, each of the virtual logs within the multiplexed log would have to be located by scanning. The number of scans for log recovery proportionally increases with the size and the number of virtual logs within the multiplexed log. The amount of time and system resources required by conventional log recovery methods is prohibitive, especially for a large scale multiplexed transactional logging system.

The present invention provides an improved system and method that enables multiplexed log recovery but requires significantly less time and fewer system resources. In one configuration, the maintenance and recovery of the multiplexed log are scaleable (independent of the size of the multiplexed log and the number of clients). These and other aspects of the invention will become apparent after reading the following detailed description.

Figure 1:
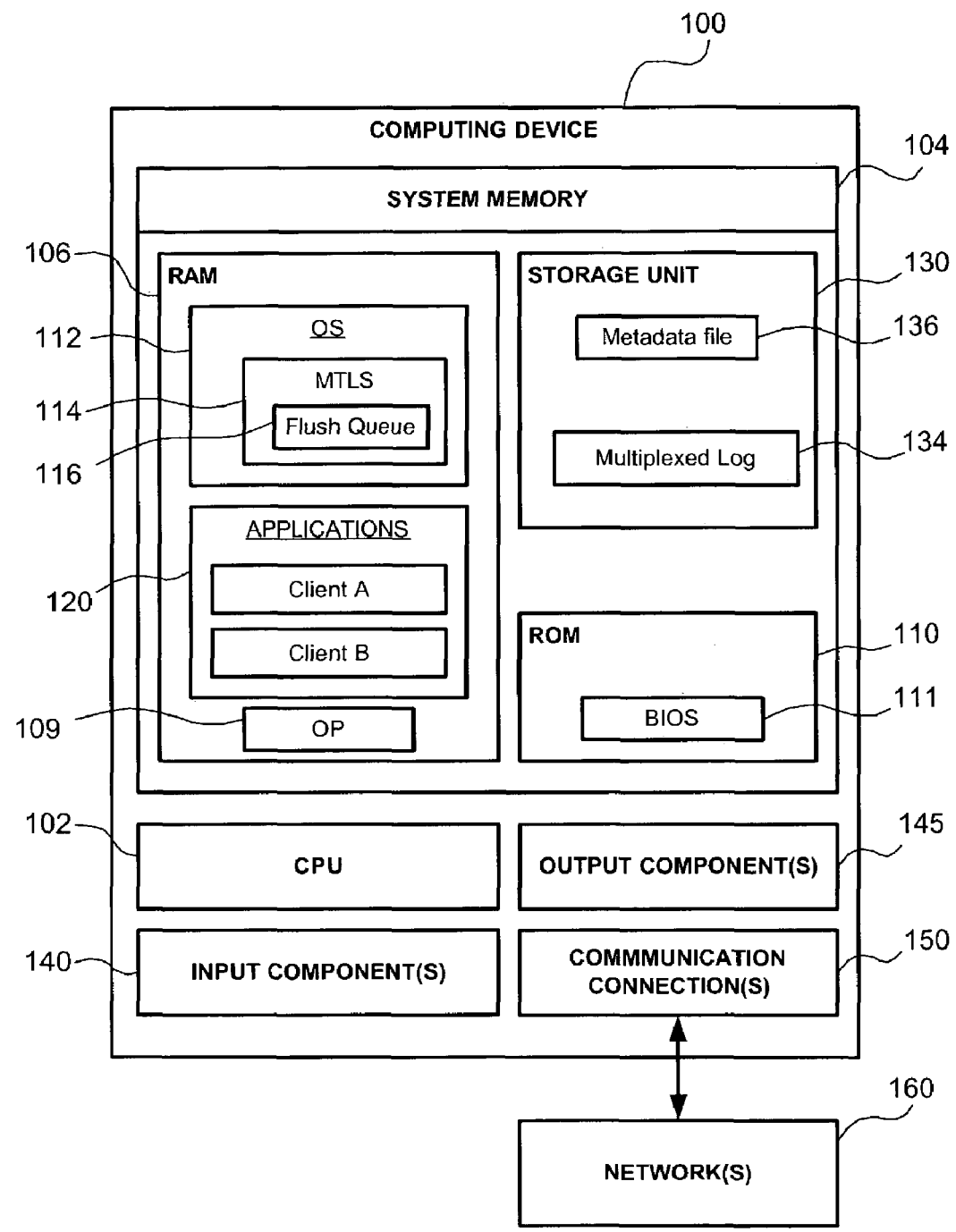
FIG. 1 illustrates an exemplary computing device that implements the present invention.

FIG. 1 illustrates an exemplary computing device 100 that may be used in one exemplary embodiment of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may include volatile memory (such as RAM 106), non-volatile memory (such as ROM 110, flash memory, etc.), and storage unit 130 (such as hard drive or other stable storage devices).

Computing device 100 may also include additional data storage devices (removable and/or non-removable) such as, for example, magnetic disks, optical disks, or tape. Computer storage media may include volatile and nonvolatile memory, storage units, removable and non-removable media implemented in any method or technology for storage of information, such as computer readable instructions, data structures, program modules, or other data. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also include input component(s) 140 such as keyboard 122, mouse 123, pen, voice input device, touch input device, etc. Output component(s) 145 such as a display, speakers, printer, etc. may also be included. These devices are well known in the art and need not be discussed at length here.

Computing device 100 may also contain communication connection(s) 150 that allow computing device 100 to communicate with other computing devices, such as over one or more network(s) 160. Signals used by communication connection(s) 150 are one example of communication media. Communication media may typically be embodied by computer readable instructions, data structures, program modules, or other data in a modulated data signal, such as a carrier wave or other transport mechanism, and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

System memory 104 typically includes BIOS 111, operating system 112, and one or more applications 120. As shown in the figure, system memory 104 may include multiplexed transactional logging system 114. Multiplexed transactional logging system 114 is a computer executable component that provides logging services for applications 120, such as Client A and Client B. For illustrative purposes, multiplexed transactional logging system 114 is shown as a part of the kernel of computing device 100. But multiplexed transactional logging system 114 may be implemented as a separate application executing in either the kernel mode or the user mode of computing device 100. Multiplexed transactional logging system 114 may also be implemented as two or more components executing in either mode.

Multiplexed transactional logging system 114 is configured to maintain and retrieve log data for applications 120. Multiplexed transactional logging system 114 maintains the log data in multiplexed log 134 stored in storage unit 130. The log data from different applications 120 are multiplexed by multiplexed transactional logging system 114 before being appended to multiplexed log 134. Typically, log data are organized into fixed size log blocks. Log blocks are grouped into regions that make up the multiplexed log 134.

Multiplexed transactional logging system 114 may defer log data in flush queue 116 before appending the log data to multiplexed log 134. Metadata, which is information about the structure and organization of the multiplexed log 134, may be included in metadata file 136 stored in storage unit 130. Metadata for multiplexed log 134 may also be appended to multiplexed log 134 as owner pages. Owner pages will be discussed in more detail in conjunction with FIG. 3. Briefly stated, an owner page contains metadata of a particular region in the multiplexed log. One or more owner pages 109 may be stored in volatile memory before they are appended to multiplexed log 134.

Figure 2:
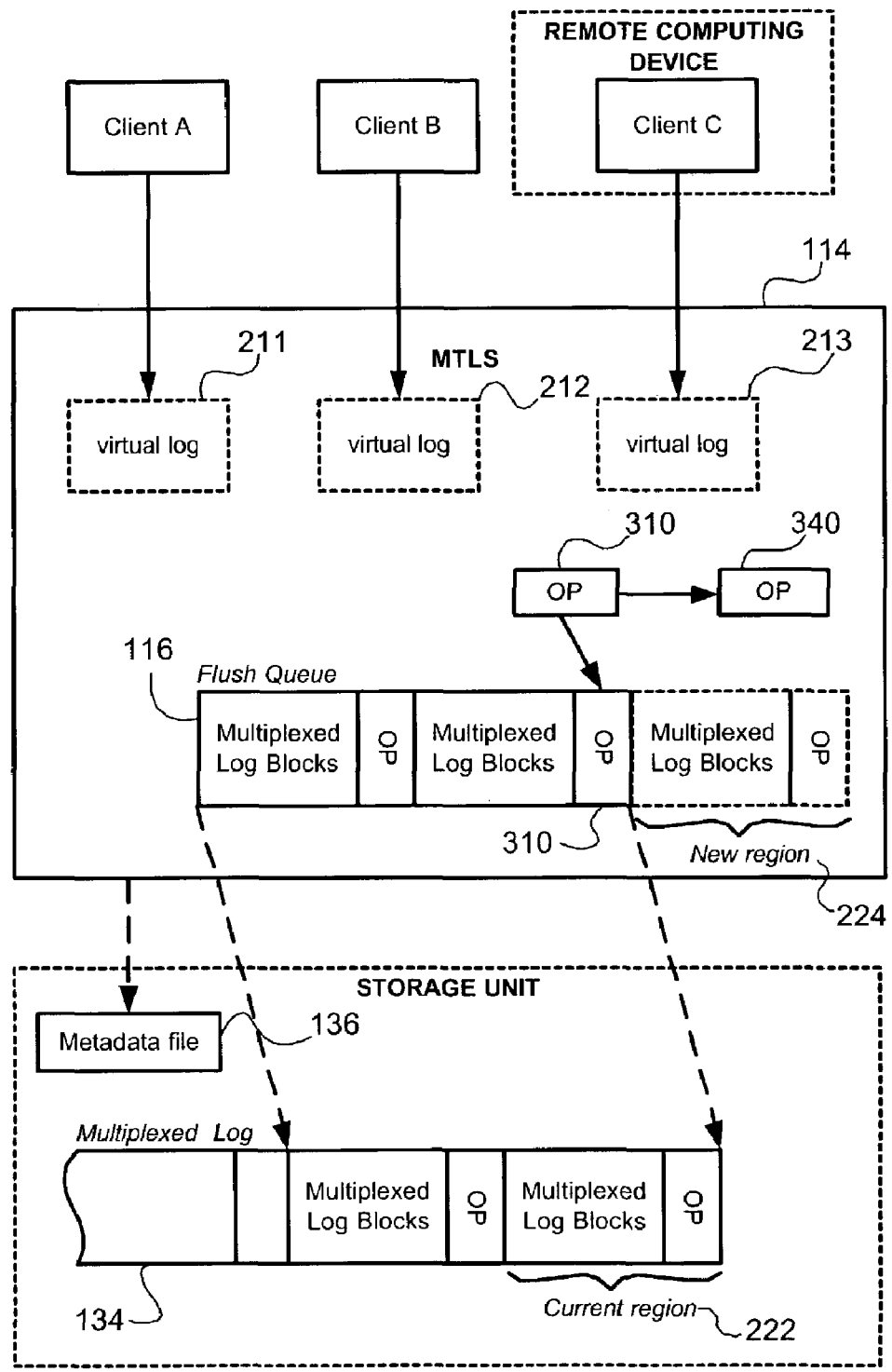
FIG. 2 is a schematic diagram of a multiplexed transactional logging system.

FIG. 2 is a schematic diagram of multiplexed transactional logging system 114. Multiplexed transactional logging system 114 provides logging services to multiple clients, such as Clients A, B and C. Each client is an application that maintains a log through the multiplexed transactional logging system 114. Examples of the clients may be a database application, a transactional file system, or the like. Clients A and B, which are also shown in FIG. 1, are applications executing in the same computing device on which multiplexed transactional logging system 114 is executing. As shown in the figure, Client C is an application executing on a remote computing device. Multiplexed transactional logging system 114 is capable of providing logging services to remote applications such as Client C.

Multiplexed transactional logging system 114 is configured to provide the illusion to each of Clients A, B, and C that a separate, dedicated log is being maintained for each client. In other words, Clients A, B, and C send log data to multiplexed transactional logging system 114 with the expectation that the log data are stored in dedicated logs. For the purpose of this discussion, the illusory dedicated logs are referred to as "virtual logs," represented in the figure as virtual logs 211–213. In actuality, multiplexed transactional logging system 114 multiplexes and appends the log data from each client to multiplexed log 134, which is shared by Clients A, B, and C. The log data are typically organized into log blocks. A log block is a unit of physical log I/O that includes a fixed-sized log block header and a body which may be of any size. In one embodiment, the size of log blocks may be multiple of the size of a sector associated with storage unit 130.

Multiplexed transactional logging system 114 may be configured to maintain owner pages, which are data structures that contain information about how log blocks are arranged in multiplexed log 134. Owner pages will be discussed in more detailed in conjunction with FIG. 3.

Briefly stated, an owner page may include information about the ownership of log blocks in a region of multiplexed log 134. Multiplexed transactional logging system 114 may use the metadata in the owner pages to organize log blocks as virtual logs 211–213 for providing logging services to Clients A, B, and C. Multiplexed transactional logging system 114 may also use the metadata in owner pages for recovering logging functionalities after a system failure. Owner pages may be appended to multiplexed log 134 as shown in the figure. Owner pages may also be appended to metadata file 136, which is a data structure separate from multiplexed log 134.

In operation, multiplexed transactional logging system 114 may receive log blocks from Clients A, B and C at different times and order. Multiplexed transactional logging system 114 multiplexes the log blocks by appending them to a single multiplexed log 134. Multiplexed transactional logging system 114 may defer appending the multiplexed log blocks using flush queue 116. Flush queue 116 is a data structure that represents the multiplexed log blocks that will be appended to multiplexed log 134. Flush queue 116 is typically stored in volatile memory. Multiplexed transactional logging system 114 may be configured to use flush queue 116 for reducing the need to access storage unit 130 and improving system performance.

For example, if storage unit 130 is a hard drive, a performance overhead is generated every time multiplexed transactional logging system 114 accesses the hard drive to append multiplexed log blocks. Multiplexed logging system 114 may be configured to write log blocks in flush queue 116 to the hard drive only when the user voluntarily requests that the log blocks be forced to the hard disk or when memory tied up by log blocks has exceeded a user-defined flush threshold. By accumulating log blocks in volatile memory using a flush queue, the performance overhead is reduced by amortizing multiple potential accesses to the hard drive with a single hard drive access.

To facilitate management of log blocks, multiplexed transactional logging system 114 maintains metadata file 136 that contains metadata about the multiplexed log 134. Metadata file 136 is typically stored in a stable storage media, such as storage unit 130. Metadata file 136 may include many different kinds of information. For example, metadata may include the owner pages of the regions of multiplexed log 134. In one embodiment of the invention, the owner pages for the regions are appended in multiplexed log 134 and metadata file 136 includes the location in multiplexed log 134 at which the last owner page in the log is appended. This location enables multiplexed transactional logging system 114 to locate the last owner page for recovering multiplexed log 134 after a system failure.

Multiplexed transactional logging system 114 may defer one or more regions of log data in flush queue 116. The owner page of the current region in the flush queue may be stored in volatile memory until the current region is filled. After receiving enough log blocks to fill a region, multiplexed transactional logging system 114 may be configured to immediately append the log blocks in the flush queue 116 to multiplexed log 134. Multiplexed transactional logging system 114 may append the owner page associated with the region to metadata file 136. Multiplexed transactional logging system 114 may also append the owner page to the region before appending the region to multiplexed log 134.

In one embodiment, multiplexed transactional logging system 114 may be configured to improve performance by reducing the overhead associated with appending log blocks to multiplexed log 134 and owner pages to metadata 136. In this configuration, multiplexed transactional logging system 114 is capable of deferring multiple regions of log blocks. For example, as shown in the figure, multiplexed log 134 has appended log blocks to flush queue 116 up to current region 222. After receiving enough log data to current region 222, multiplexed transactional logging system 114 creates new owner page 340 for new region 224 and appends current owner page 310 associated with current region 222 to the flush queue 116. Multiplexed transactional logging system 114 may copy some of the data in current owner page 310 to new owner page 340. Multiplexed transactional logging system 114 may append the log blocks in flush queue 116 to multiplexed log 134 when the size of the flush queue 116 reaches a critical value, when a client instructed its log blocks be immediately appended to multiplexed log 134, or some other predetermined events.

The log blocks in flush queue 116 may be appended to multiplexed log 134 in any order. Typically, each region in flush queue 116 is appended to multiplexed log 134 in sequential order. The log blocks in each region may be appended in any order.

Figure 3:
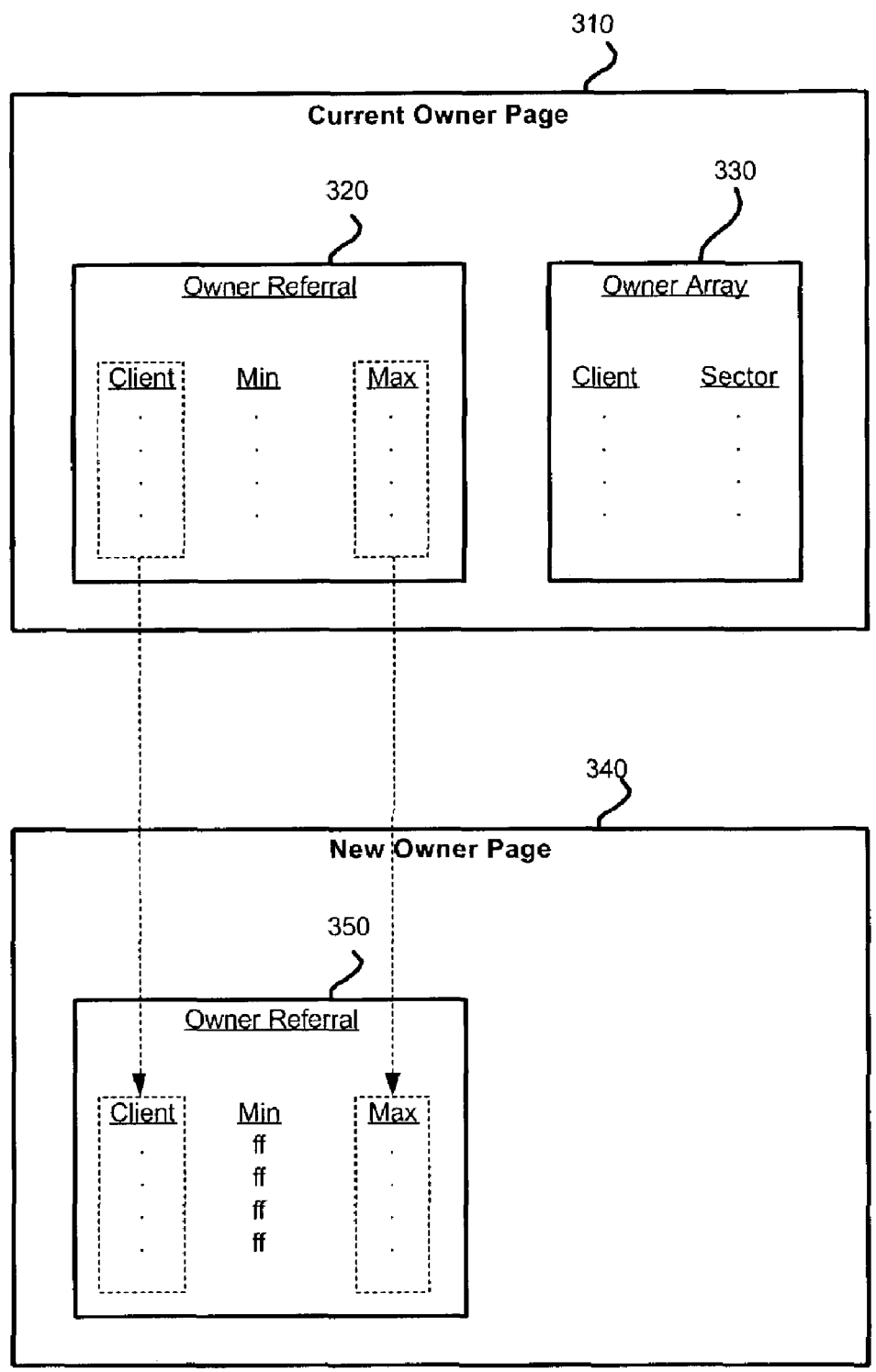
FIG. 3 is a graphical representation of two exemplary owner pages.

FIG. 3 is a graphical representation of two exemplary owner pages. Current owner page 310 is associated with current region 222 shown in FIG. 2 and new owner page 340 is associated with new region 224. Generally stated, an owner page contains information about client ownership of the log blocks in a region. In one embodiment, the owner page is a special log block with the metadata that associates the log blocks with the clients. The owner pages may be stored at specified intervals within the multiplexed log so that the locations of the owner pages may be determined directly, as opposed to scanning the entire multiplexed log. An owner page may include an owner referral and an owner array.

Owner referral 320 maps each client to a range of locations within the multiplexed log where log blocks owned by the client are found. As shown in the figure, owner referral 320 of current owner page 310 contains a minimum location identifier and a maximum location identifier for each client that has log blocks in current region 222. The minimum location identifier identifies a location where the beginning of the client's first log block in the region is found. The maximum location identifier identifies a location where the end of the client's the last log block in the multiplexed log is found. In one embodiment, the minimum location identifiers and the maximum identifiers are strictly monotonically increasing within a client's virtual log. Owner array 330 identifies the client owner of each of the sectors associated with current region 222.

New owner page 340 is an owner page created for a new region 224 after current region 222 has been filled. For illustrative purposes, no log data have been appended to new region 224. To create new owner page 340, some of the data from current owner page 310 may be copied to new owner page 340. In one embodiment, the maximum location identifiers in the owner referral of a current owner page are copied to the owner referral of a new owner page. As shown in the figure, the maximum location identifier for each of the clients in owner referral 320 is copied to owner referral 350. The minimum location identifiers in owner referral 350 are filled with place-holders. In this embodiment, only some of the data and not all the data are copied. New owner page 340 initializes its owner array to indicate that nothing has been written to its log region.

It is to be appreciated that copying maximum location identifiers from a current owner page to a new owner page enables the new owner page to identify where the last log block of each of the clients is located in the multiplexed log. In other words, the new owner page may be used as a look-up table for finding the end of each of the virtual logs in the multiplexed log. A scaleable process that determines the end of a multiplexed log using the owner referral of an owner page will be discussed in detail in conjunction with FIG. 8.

Figure 4:
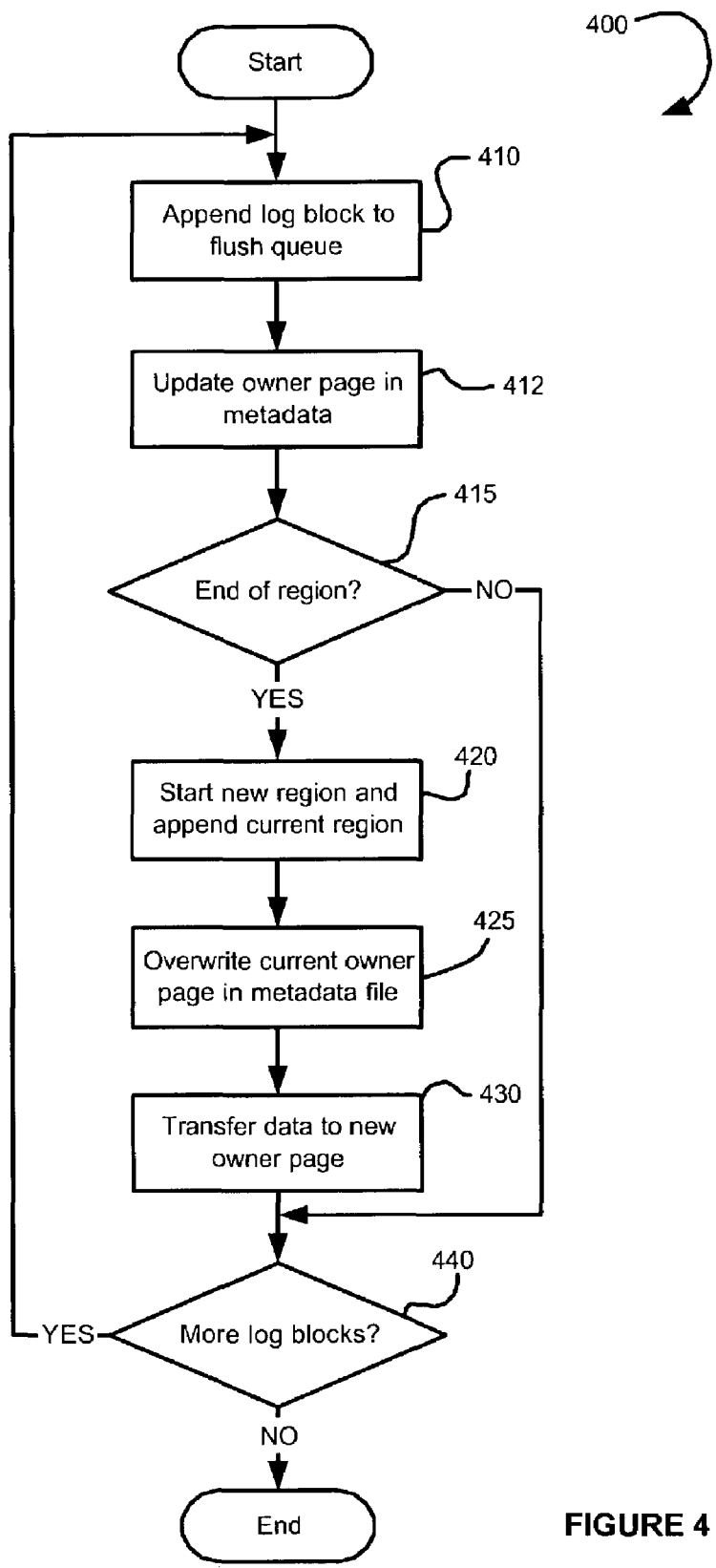
FIG. 4 is an operational flow diagram of an exemplary process for handling log blocks from a client.

FIG. 4 is an operational flow diagram of an exemplary process 400 for handling log blocks from a client. Moving from a start block, process 400 goes to block 410 where a log block is appended to a flush queue.

At block 412, the owner page of the current region is updated. This current owner page may be included in a metadata file stored in a stable storage medium. The current owner page is immediately modified and flushed to the metadata file to account for the newly appended log block. The process continues at decision block 415.

At decision block 415, a determination is made whether the end of the current region is reached. If so, process 400 goes to block 420 where a new region is started and the current region is appended to the multiplexed log. The current owner page is appended to the current region and is appended to the multiplexed log along with the current region. At block 425, the current owner page in the metadata file is overwritten to create a new owner page. At block 430, certain data from the current owner page are transferred to the new owner page. Process 400 continues at decision block 440.

Returning to block 415, if the end of the current region is not reached, the process continues at decision block 440. At decision block 440, a determination is made whether more log blocks are ready for appending to the multiplexed log. If so, process 400 returns to block 410. If no log block is ready for appending, the process ends.

Since process 400 requires the multiplexed log and the metadata file to be updated for each new log blocks, the multiplexed log is readily recoverable. However, it is to be appreciated that a relatively large amount of system resources would have to be dedicated for constantly accessing one or more stable storage media where the multiplexed log and the metadata file are stored. In particular, every log block requires accessing a stable storage medium (e.g. a hard disk) at least twice: one to write the metadata and one to append the log block to the multiplexed log.

Figure 5:
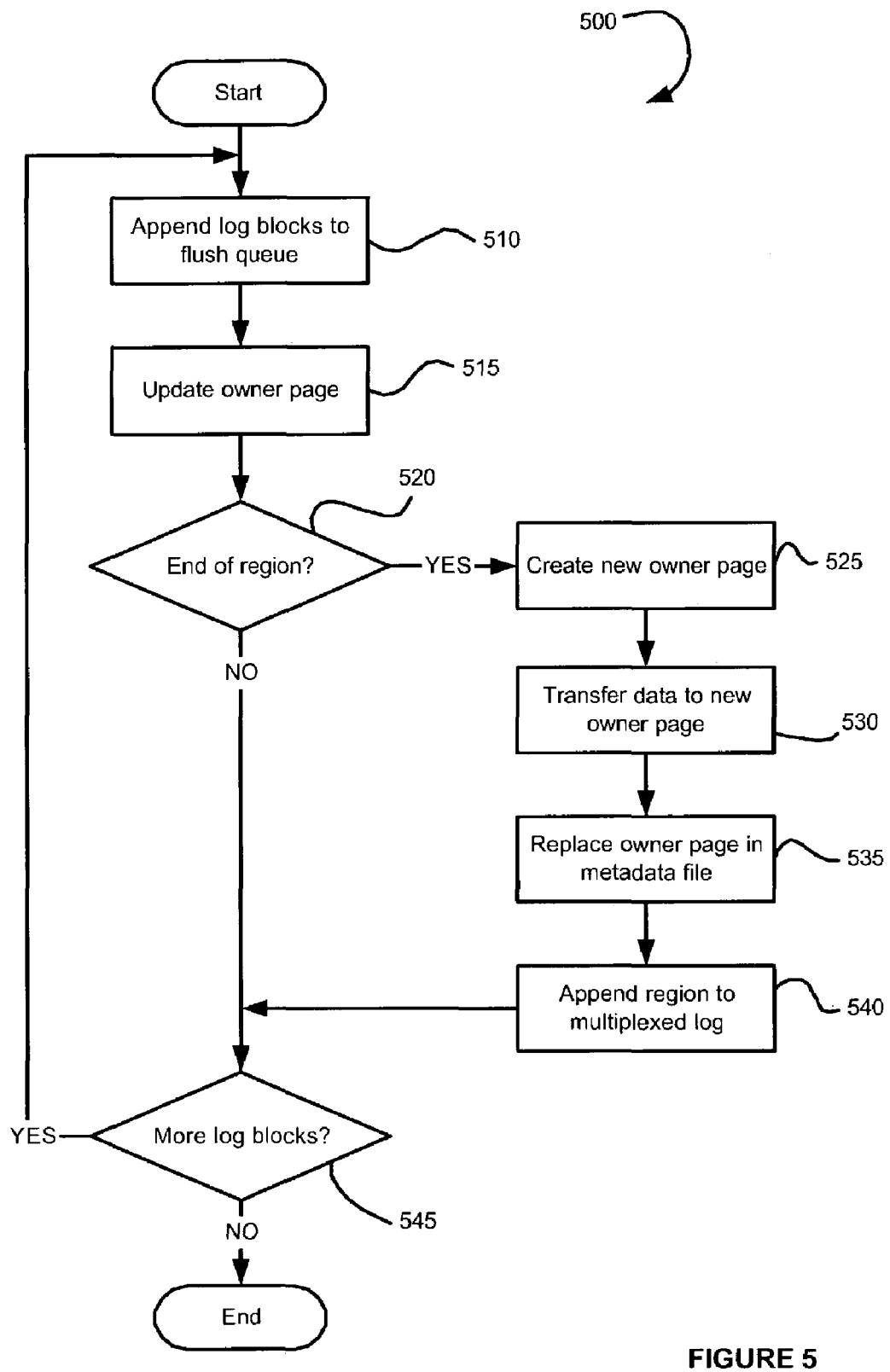
FIG. 5 is an operational flow diagram of another exemplary process for handling log blocks from a client.

FIG. 5 is an operational flow diagram of another exemplary process 500 for handling log blocks from a client. Moving from start block, process 500 moves to block 510 where a log block is appended to a flush queue. At block 515, the owner page of the current region is updated. The owner page may be stored in volatile memory. The current owner page is modified to account for the newly appended log data. Process 500 continues at decision block 520.

At decision block 520, a determination is made whether the end of the current region is reached. If so, a new region is started in the flush queue and process 500 goes to block 525 where a new owner page associated with the new region is created in volatile memory. At block 530, certain data from the current owner page are transferred to the new owner page. At block 535, the current owner page in a metadata file is replaced with a new owner page for the new region. The metadata file may be stored in a stable storage medium. At block 540, the current region in the flush queue is forced to the multiplexed log. Process 500 continues at decision block 545.

At decision block 545, a determination is made whether more log blocks are ready for appending. If so, process 500 returns to block 510. If no log block is ready for appending, the process ends.

It is to be appreciated that process 500 consumes less system resources and incurs less I/O overhead than process 400 discussed previously in conjunction with FIG. 4. Deferring the log blocks in a flush queue before appending them to the multiplexed log and keeping the owner page of the current region in volatile memory reduce the frequency for accessing one or more stable storage media where the multiplexed log and the metadata file are stored. The disadvantage of process 500 is that the flush queue is forced to the multiplexed log at the end of every log region. Forcing the flush queue occurs when the end of a region is reached, as opposed to the voluntary intent of a log client. This is not desirable because during forward progress an efficient logging system should allow its clients to voluntarily determine when to incur a performance penalty associated with forcing the flush queue to a log.

For process 500, since the multiplexed log and the metadata file are not updated until a complete region is actually appended and forced to non-volatile storage, a process is needed for recovering the multiplexed log in case a system failure occurs while log blocks are stored in the flush queue but before they actually make it to non-volatile storage. An exemplary recovery process associated with process 500 will be discussed in conjunction with FIG. 7.

Figure 6:
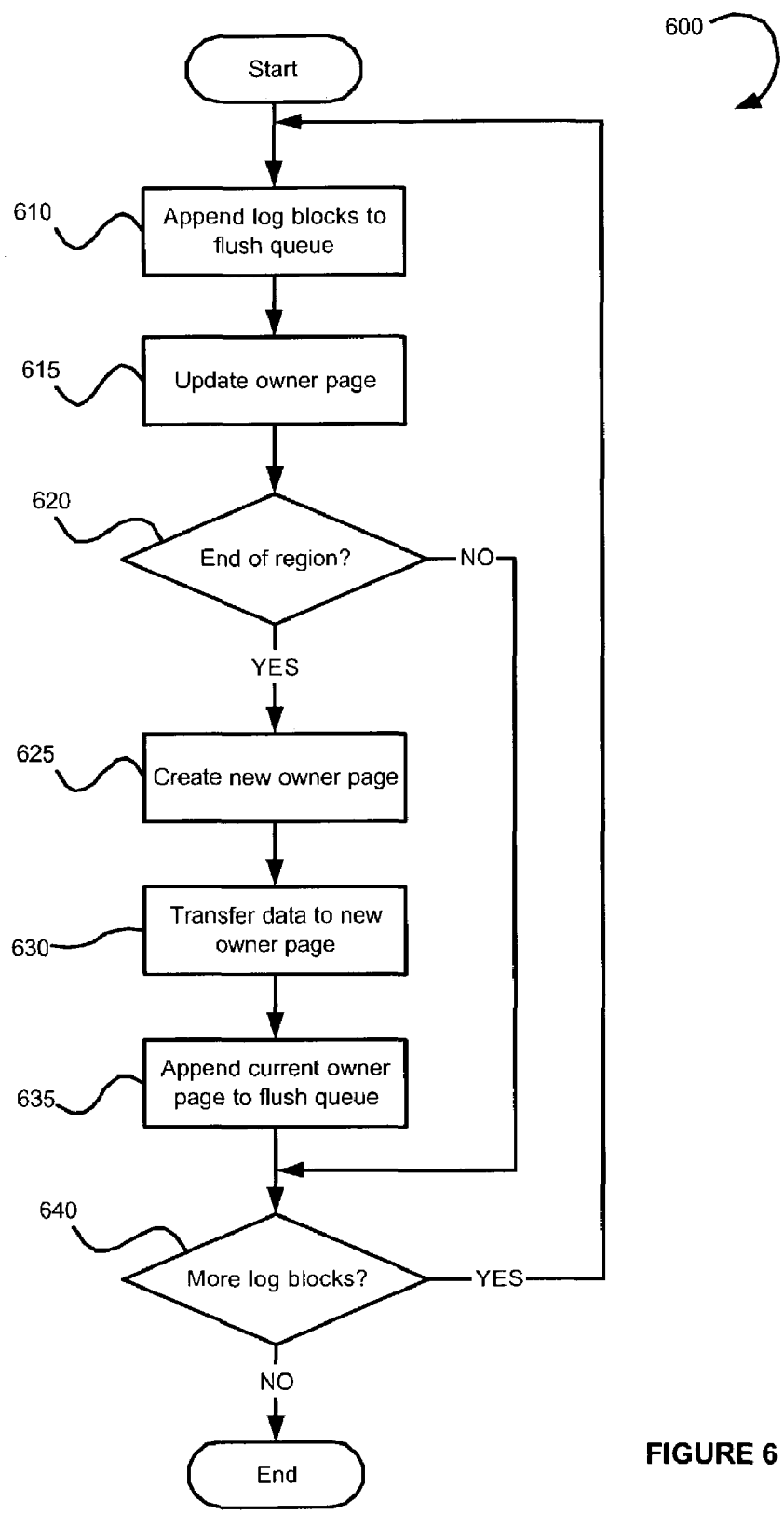
FIG. 6 is an operational flow diagram of yet another exemplary process for handling log blocks from a client.

FIG. 6 is an operational flow diagram of yet another exemplary process 600 for handling log blocks from a client. Moving from start block, process 600 moves to block 610 where a log block is appended to a flush queue. At block 615, the owner page of the current region cached in volatile memory is updated to account for the newly appended log block. The process continues at decision block 620.

At decision block 620, a determination is made whether the end of the current region is reached. If so, a new region is started in flush queue and process 600 goes to block 625 where a new owner page associated with the new region is created in volatile memory. At block 630, certain data from the current owner page are transferred to the new owner page. At block 635, the current owner page is appended to the flush queue as a log block. It is to be appreciated that process 600 does not require the owner page to be stored separately and immediately in a stable storage medium. The process also enables multiple regions of log blocks to be appended to the flush queue. Thus, process 600 reduces system overhead but still allows recovery of the multiplexed log.

At decision block 640, a determination is made whether more log blocks are ready for appending. If so, process 600 returns to block 610. If no log block is ready for appending, the process ends.

It is to be appreciated that process 600 incurs even less system resources than process 500 discussed previously in conjunction with FIG. 5. Unlike process 400 and process 500, process 600 does not force a flush queue to be appended to a multiplexed log when an owner page is appended to the flush queue. Thus, process 600 enables clients to control when the flush queue is forced to stable storage in the multiplexed log.

Process 600 also allows forward progress of the multiplexed log to incur little or no I/O overhead when compared with a dedicated log system. Thus, forward progress is scaleable because appending owner pages to the flush queue occurs in constant time and does not incur undesirable and unexpected overhead associated with forcing the flush queue to stable storage in the multiplexed log.

However, because multiple regions of log blocks may be in the flush queue when a system failure occurs, a sophisticated process is required to recover a multiplexed log maintained by process 600. An exemplary recovery process associated with process 600 will be discussed in conjunction with FIG. 8.

Figure 7:
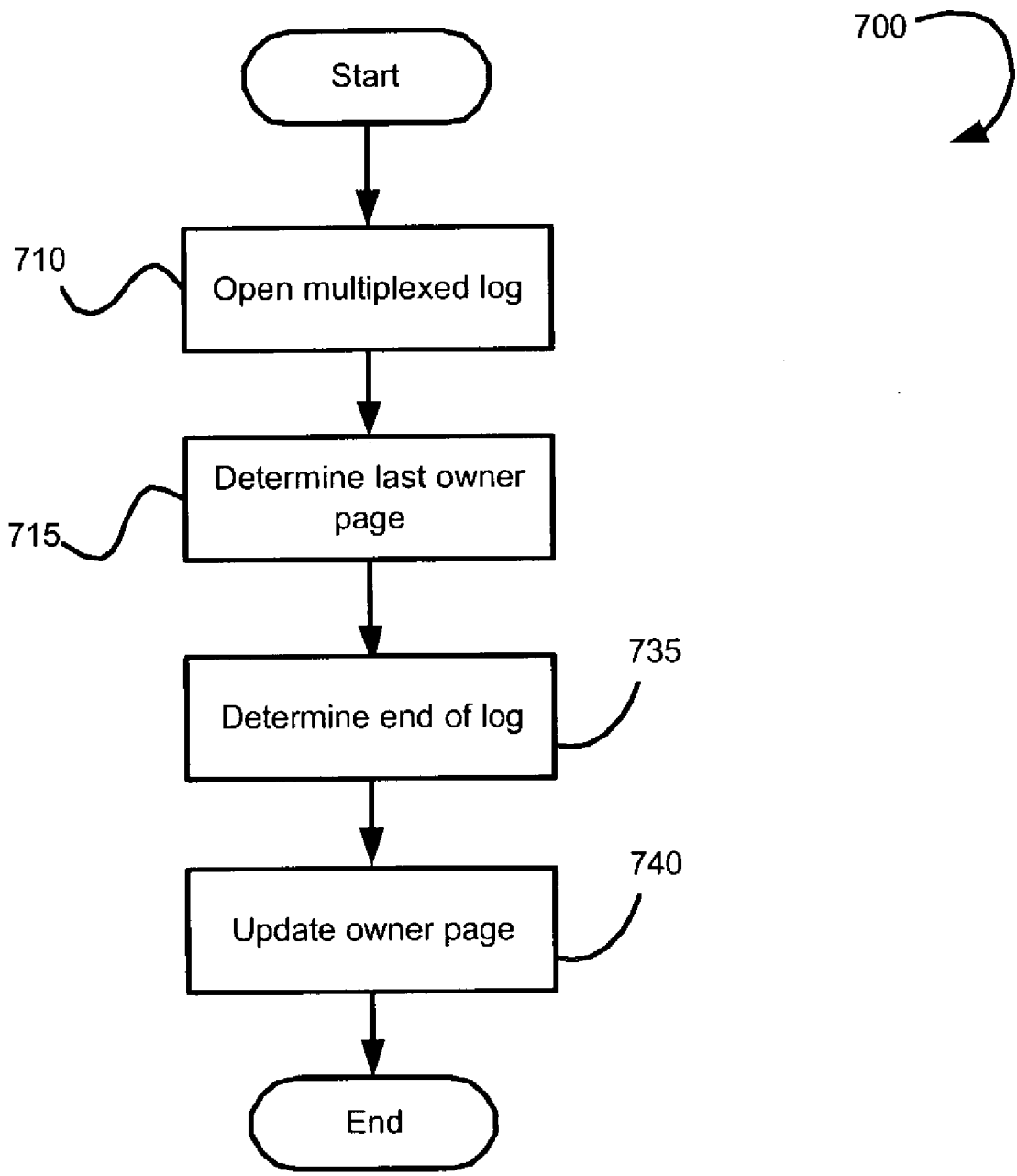
FIG. 7 is an operational flow diagram of an exemplary process for recovering a multiplexed log.

FIG. 7 is an operational flow diagram of an exemplary process 700 for recovering a multiplexed log. Process 700 may be used to recover log blocks appended to a multiplexed log using process 500 described in conjunction with FIG. 5. Process 700 begins after a system failure. Moving from a start block, the process moves to block 710 where the multiplexed log is opened. At block 715, the last owner page in the multiplexed log is determined. The last owner page and its location in the multiplexed log are determined by referring to metadata associated with the multiplexed log.

Process 700 continues at block 735 where the end of the multiplexed log is determined. The end of the multiplexed log may be determined by sequentially checking each log block from the start of the region associated with the last owner page. The log blocks of the region are sequentially checked until an invalid log block is determined, indicating the end of the multiplexed log. After the end of the multiplexed log was determined, the process moves to block 740 where the last cached owner page is updated. For example, some of the entries in the owner page may have to be deleted to account for the log blocks that were not appended to the multiplexed log due to the system failure. Process 700 then ends.

Figure 8:
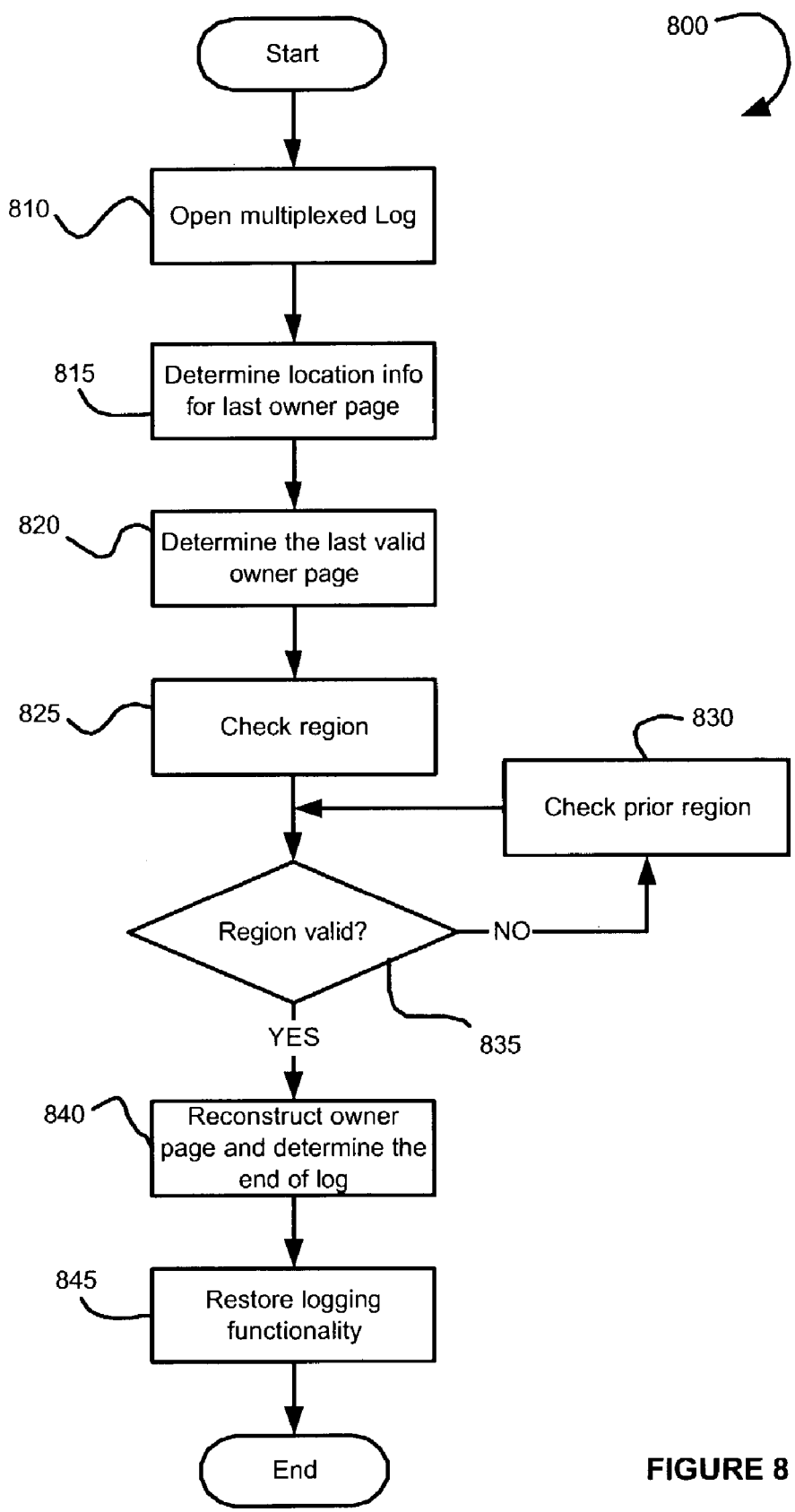
FIG. 8 is an operational flow diagram of another exemplary process for recovering a multiplexed log.

FIG. 8 is an operational flow diagram of another exemplary process 800 for recovering a multiplexed log. Process 800 may be used to recover log blocks appended to a multiplexed log using process 600 described in conjunction with FIG. 6. Moving from a start block, the process moves to block 810 where the multiplexed log is opened.

Process 800 moves to block 815 where location information of the last owner page in the multiplexed log is determined. The location information of the last owner page is typically stored in a metadata file as metadata. To improve performance, metadata may not be updated very frequently. Thus, the location information may not indicate the location of the last owner page that was actually appended to the multiplexed log. But the indicated location may be used as a starting point.

At block 820, the last valid owner page is determined. The last valid owner page may be determined beginning from the starting point indicated by the location information determined at block 815 and scanning forward in the multiplexed log at a fixed interval. The fixed interval may coincide with the size of the fixed size region. Scanning forward across owner pages may be performed by a linear scan or an exponential back out followed by a binary search of owner pages. When the last valid owner page is located, process 800 continues at 825.

At block 825, the log blocks in the region associated with the last valid owner page are checked. Many methods for checking data validity may be used. One exemplary method is linearly validating each block in the region. Process 800 continues at decision block 835 where a determination is made whether the region is valid. If not, the process goes to block 830 where the prior region is checked and loops back to decision block 835. The loop continues until a valid region is found. Typically, the last valid region is further down the multiplexed log than the starting point. Then, process 800 moves to block 840.

At block 840, the owner page is reconstructed in memory from the log blocks of the incomplete region and the end of the multiplexed log is determined. The last valid log block of multiplexed log may be determined by checking log blocks located after the last valid region. Each log block is checked for validity until an invalid log block is located. Information obtained from checking the log blocks may be used to reconstruct the owner page. When the owner page is reconstructed, the end of each of the virtual logs in the multiplexed log is readily determined by the reconstructed owner page. As discussed in conjunction with FIG. 3, maximum location identifiers are copied into the owner referral of a new owner page. For process 800, maximum location identifiers in the owner referral of the reconstructed owner page identify the last log block of each of the client in the multiplexed log. Thus, the end of each of the virtual logs is readily determined. At block 845, logging functionality on the multiplexed log is restored and process 800 ends.

It is appreciated using process 800, log recovery is scaleable because the process involves a bounded scan of regions towards the end of the multiplexed log. The bound is determined by the flush threshold, which is typically set by the log clients. Finding the end of the multiplexed log and the end of each of the virtual logs is also scaleable because the process is a constant time and space table lookup independent of the size of the multiplexed log and the number of clients. Furthermore, after recovery, little or no I/O overhead is incurred since the owner referral of the last region that was recovered by process 800 is already reconstructed in memory.

It is further appreciated that multiplexed log recovery process 800 in conjunction with the forward progress process 600 minimizes the log I/O overheard during forward progress of the multiplexed log at the expense of a more elaborate recovery scheme after system failure. During normal forward progress, the client, not the logging system, determines when the flush queue is forced to stable storage. Thus, the normal forward progress of the multiplexed log is efficient. The advantages of having an efficient forward progress are offset only in the rare event of a log recovery after a system failure. But even this offset is minimal because the multiplexed log recovery process 800 is scaleable. Thus, the system and method of the present invention optimize normal forward progress of a multiplexed log with the compromise of a more elaborate recovery process in the exceptional case of log recovery. With a recovery process that is scaleable, determination of the end of each of the virtual logs in the multiplexed log requires very little effort.

The above specification, examples and data provide a complete description of the invention. Since many embodiments of the invention can be made without departing from the spirit and scope of the invention, the invention resides in the claims hereinafter appended.

I claim:

1. A transactional logging system comprising:
   a transactional log associated with a storage unit, wherein the transactional log contains log blocks from a plurality of clients and wherein a plurality of owner pages include information on how the log blocks are organized in the transactional log;
   a metadata file including information about the transactional log;
   a multiplexed transactional logging component configured to append the log blocks and the owner pages to the transactional log and to recover the transactional log after a system failure using information in the owner pages and the metadata file; determine the last valid owner page in the transactional log by search from a starting point indicated in the metadata file and determine a last valid region in the transactional log by sequentially checking each region from the starting point toward the beginning of the transactional log.

2. The transactional logging system of claim 1, further comprising a flush queue stored in volatile memory, wherein the multiplexed transactional logging component is configured to defer the log blocks and the owner pages in the flush queue.

3. The transactional logging system of claim 2, wherein the multiplexed transactional logging component is configured to append the log blocks in the flush queue to the transactional log in response to an occurrence of a predetermined event.

4. The transactional logging system of claim 3, wherein the predetermined event occurs when the flush queue reaches a threshold value.

5. The transactional logging system of claim 3, wherein the predetermined event occurs when one of the clients issues a command to immediately append a log block to the transactional log.

6. The computer-implemented method of claim 1, wherein the log blocks in the transactional log are organized into regions and wherein each of the owner pages is uniquely associated with one of the regions.

7. The transactional logging system of claim 6, wherein at least one owner page is stored in volatile memory.

8. The transactional logging system of claim 7, wherein the multiplexed transactional logging component is configured to append the owner page cached in volatile memory to the flush queue as the last block of a region.

9. The transactional lagging system of claim 1, wherein the multiplexed transactional logging component is configured to determine an end of the transactional log by sequentially checking each log block from the end of the last valid region toward the end of the transactional log.

10. The transactional logging system of claim 9, wherein the multiplexed transactional logging component is configured to reconstruct the owner page associated with the region where the end of the transactional log is located.

11. The transactional logging system of claim 9, wherein the multiplexed transactional logging component is configured to resume providing logging services to the client using the reconstructed owner page.

12. A computer-implemented method for transactional logging, comprising:
  maintaining a multiplexed log for a plurality of clients using a scaleable logging process; and
  recovering the multiplexed log after a system failure using a scaleable recovery process, wherein the scaleable recovery process comprises: determining a last valid owner page by scanning forward in the multiplexed log at a fixed interval; wherein in response to determining the last valid owner page, determining a last valid region in the multiplexed log comprising checking whether a region associated with the last valid owner page is valid; wherein in response to determining a last valid region, determining an end of the multiplexed log and ends to a plurality of virtual logs within the multiplexed log using a scaleable end-of-log locating process; wherein the scaleable end-of-log locating process comprises checking log blocks in an incomplete region, and wherein the incomplete region is located after the last valid owner page in the multiplexed log.

13. The computer-implemented method of claim 12, wherein the scaleable logging process comprises appending log blocks to a flush queue until an occurrence of a predetermined event.

14. The computer-implemented method of claim 13, wherein the predetermined event occurs when a command is issued by one of the clients to append the flush queue to the multiplexed log.

15. The computer-implemented method of claim 13, wherein the predetermined event occurs when a size of the flush queue exceeds a threshold value.

16. The computer-implemented method of claim 12, wherein the scaleable logging process comprises appending an owner page to a flush queue without appending the flush queue to the multiplexed log.

17. The computer-implemented method of claim 12, wherein the scaleable logging process comprises in response to reaching an end of a current region in the multiplexed log, creating a new region.

18. The computer-implemented method of claim 17, wherein the scaleable logging process comprises in response to reaching an end of a current region in the multiplexed log, creating a new owner page associated with the new region.

19. The computer-implemented method of claim 18, wherein the scaleable logging process comprises appending a current owner page associated with the current region to a flush queue.

20. The computer-implemented method of claim 18, wherein the current owner page includes a current owner referral and the new owner page includes a new owner referral.

21. The computer-implemented method of claim 20, wherein creating the new owner page includes copying data from the current owner referral to the new owner referral.

22. The computer-implemented method of claim 21, wherein the data includes a plurality of maximum location identifiers.

23. The computer-implemented method of claim 12, wherein the fixed interval coincides with a size of a region in the multiplexed log.

24. The computer-implemented method of claim 12, wherein determining the last valid owner page is performed by a linear scan.

25. The computer-implemented method of claim 12, wherein determining the last valid owner page is performed by an exponential back out followed by a binary search.

26. The computer-implemented method of claim 12, wherein if the region associated with the last valid owner page is not valid, checking prior regions in the multiplexed log until the last valid region is determined.

27. The computer-implemented method of claim 12, wherein the scaleable end-of-log locating process comprises creating a reconstructed owner page associated with the incomplete region.

28. The computer-implemented method of claim 27, wherein the last valid owner page includes a last valid owner referral and the reconstructed owner page includes a reconstructed owner referral.

29. The computer-implemented method of claim 28, wherein creating the reconstructed owner page includes copying data from the last valid owner page to the reconstructed owner page.

30. The computer-implemented method of claim 29, wherein the data includes a plurality of maximum location identifiers.

31. The computer-implemented method of claim 30, wherein the scaleable end-of-log location process comprises determining ends of virtual logs within the multiplexed log using the reconstructed owner page.

32. The computer-implemented method of claim 30, wherein each of the maximum location identifiers indicates an end of each of a plurality of virtual logs within the multiplexed log.

* * * * *